April 22, 1952  F. M. COURTNEY ET AL  2,593,987
THREE-PHASE MOTOR CONTROL APPARATUS
Filed June 21, 1951
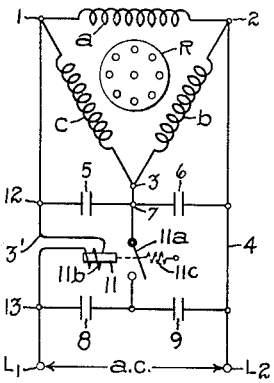
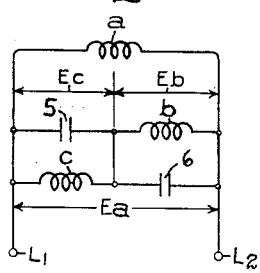
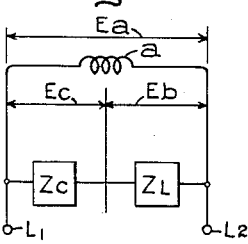
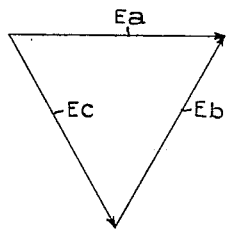
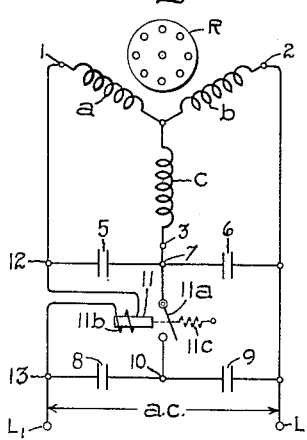
Inventors
Frederick M. Courtney,
Harold H. P. Lemmerman,
by *[signature]*
Their Attorney.

Patented Apr. 22, 1952

2,593,987

UNITED STATES PATENT OFFICE 2,593,987

THREE-PHASE MOTOR CONTROL APPARATUS

Frederick M. Courtney, Scotia, and Harold H. P. Lemmerman, Schenectady, N. Y., assignors to General Electric Company, a corporation of New York Application June 21, 1951, Serial No. 232,804

4 Claims. (Cl. 318—221)

1

Our invention relates to control apparatus for three-phase induction motors, and more particularly to apparatus for starting and running three-phase induction motors from a single phase source of alternating electric current supply. The invention further comprehends a starting means responsive to motor overload to restore the starting connections upon stalling or slowing down of the motor.

It is well understood by those skilled in the art that an induction motor having a single running winding may be operated from a single phase source of electric current supply, but that in order to start the motor in operation, it is necessary to provide the motor also with a starting winding, the starting and running windings being physically disposed in angularly spaced relation and supplied with starting currents electrically displaced in phase. For such operation of a single phase induction motor, it is common to connect a capacitor in series with the starting winding in order to obtain a phase displacement of the current in the starting winding with respect to that in the running winding. Such capacitors are usually built into the motor casing itself, and the capacitor and running winding are disconnected after the motor is up to speed.

In certain precision applications of small motors, it has been found undesirable to utilize built-in capacitors because of the increased size of the motor casing, and it has been further found desirable to utilize a three phase induction motor rather than a single phase induction motor because of the improved operating characteristics of the three phase motor. Such a three phase induction motor may be started from a single phase source of alternating current supply in a manner similar to the starting of a single phase motor, i. e., by connecting phase modifying impedances in circuit with some but not all of the motor stator windings; but in running operation, such a three phase motor should have all of its stator windings left in circuit, so that phase modifying means are required for running as well as starting operation. However, because of the different values of motor starting impedance and motor running impedance, it is desirable to change the values of the phase modifying impedances between the running and starting conditions. Moreover, it is desirable that if the motor should stall or slow down, automatic restoration of the starting connections shall take place.

Accordingly, therefore, it is a general object of our invention to provide new and improved

2 means for starting and running a three phase induction motor from a singe phase source of alternating electric current supply.

It is a further object of our invention to provide, in such apparatus, automatic means for shifting the motor connections from a starting to a running condition, and to provide also means responsive to motor overload for restoring the starting connections.

In carrying out our invention in one form, we provide a pair of electric conductors for connecting two of the three terminals of a three phase induction motor to a single phase source of alternating electric current supply, and connect across the conductors in series circuit relation a pair of unequal capacitors. The center or common terminal of the capacitors is adapted to be connected to the third motor terminal. In order to change the value of the phase modifying capacitors under starting conditions, we connect across the conductors a second pair of unequal capacitors connected in series circuit relation and having a common or center terminal connected to the common terminal of the first pair of capacitors through a starting switch. The second pair of series connected capacitors are disconnected from the motor under normal running conditions by a suitable means responsive to current in one of the conductors.

Our invention will be more fully understood and its objects and advantages further appreciated by referring now to the following detailed specification taken in conjunction with the accompanying drawing, in which Fig. 1 is a schematic circuit diagram of a three phase induction motor control apparatus embodying our invention; Fig. 2a is a simplified circuit diagram of the running connection of the motor circuit shown at Fig. 1; Fig. 2b is an equivalent circuit diagram representing the circuit of Fig. 2a; Fig. 3 is a diagrammatic representation of the phase voltage relationships characteristic of the circuits of Figs. 2a and 2b; and Fig. 4 is a schematic circuit diagram of our new and improved motor control apparatus shown applied to a different type of three phase induction motor.

Referring now to the drawing, and more particularly to Fig. 1, we have illustrated a three phase squirrel cage induction motor having delta-connected stator windings $a$, $b$ and $c$ and a rotor R. The delta-connected stator windings $a$, $b$ and $c$ are brought out to three motor terminals 1, 2 and 3, accessible externally of the motor casing (not shown). A pair of electric conductors 3 and 4 are connected respectively between the motor terminals 1 and 2 and the opposite terminals of a suitable source of single phase alternating electric current supply represented by a pair of line terminals $L_1$ and $L_2$. A pair of unequal capacitors 5 and 6 are connected in series circuit relation between the conductors 3 and 4, and have their common or center terminal 7 directly connected to the motor terminal 3. A second pair of unequal capacitors 8 and 9 are connected in series circuit relation between conductors 3 and 4 and have their center or common terminal 10 adapted to be connected through a normally open contact 11a of a starting relay 11 to the common capacitor terminal 7. The two pairs of unequal capacitors 5, 6 and 8, 9 are similarly connected across the conductors 3, 4, so that the larger capacitor of each pair, as for example the capacitors 5 and 8, have their line terminals 12 and 13 connected to the same conductor, i. e., the conductor 3. The relay 11 is provided with a current responsive winding 11b connected in the conductor 3 between the capacitor line terminals 12 and 13, and arranged to close the relay contact 11a during the starting interval when the line current is high. A biasing spring 11c is shown connected to retain the contact 11a normally open.

It will now be evident that in operation, when the conductors 3 and 4 are connected to the alternating current supply source, a large starting current flows through the motor windings and through the relay coil 11b, so that the capacitors 5 and 8 are connected in parallel circuit relation across the motor winding c and the capacitors 6 and 9 are connected in parallel circuit relation across the motor winding b. The motor winding a is connected directly across the alternating current supply source. Since the capacitors 5 and 8 are larger than the capacitors 6 and 9, the current in the motor winding c is displaced from the current in the motor winding a by a different angular amount than is the current in the motor winding b. Thus, the currents in the three motor windings are all in angularly displaced relation with respect to each other, so that a rotating field flux is established to start the motor. When the motor comes up to speed, the line current is reduced and the relay coil 11b allows the contact 11a to open, thereby to disconnect the capacitors 8 and 9 from the motor. By this action, only the capacitors 5 and 6 remain effective to modify the phase of the currents in the motor windings b and c. In the event that the motor should stall or slow down, the line current is so increased that the relay contact 11a is again closed to restore the starting connections of the motor.

To demonstrate the dephased relationship of motor winding currents, we have shown at Fig. 2a a simplified line-to-line circuit diagram of the running connections for the motor circuit shown at Fig. 1. In the diagram of Fig. 2a, the capacitors 8 and 9 have been omitted since, in the running connection, these capacitors are merely connected across the line in parallel circuit relation with the motor. It will be evident from Fig. 2a that the motor stator winding a is connected directly across the single phase alternating current line, while the winding b, shunted by the small capacitor 6, and the winding c, shunted by the large capacitor 5, are connected in series across the line. At Fig. 2b we have shown the equivalent circuit, where $Z_c$ represents winding c and capacitor 5 in parallel, and $Z_L$ represents winding b and capacitor 6 in parallel.

It will now be evident from Fig. 2b that the line voltage vector $\bar{E}a$ must equal the vector sum of $\bar{E}b$ and $\bar{E}c$. It may be assumed that for any particular motor condition, such as running under normal load, the inductive impedances of the windings a, b and c are equal. Let it be further assumed that the capacitor 5 in parallel with winding c is so large that $Z_c$ is capacitive, and that the capacitor 6 is so small that $Z_L$ is inductive. Then, since the same current flows through $Z_c$ and through $Z_L$, the voltage $\bar{E}c$ must lag this current, and the voltage $\bar{E}b$ must lead the current. This means that so long as capacitors 5 and 6 are unequal, the winding voltage vectors $\bar{E}c$ and $\bar{E}b$ are relatively displaced in phase. But since $\bar{E}a = \bar{E}b + \bar{E}c$ these voltage vectors must have the form of Fig. 3. It will thus be evident to those skilled in the art that by proper choice of the capacitors 5 and 6 this voltage triangle may be made equilateral. It will also be evident that since the motor winding voltages have a displaced phase relationship as shown, and since the winding impedances are equal, the motor winding currents are in a similarly displaced phase relationship. The phase fluxes established by these phase currents are in phase with the relatively displaced currents, so that an electrically rotating field is maintained.

It will now be further evident to those skilled in the art that if the capacitors 5 and 6 are equal, the voltages $Ec$ and $Eb$ will be in phase with each other and with the voltage $Ea$, so that no rotating field will be obtained. Similarly, if the large and small capacitors are interchanged, the direction of field rotation will be reversed.

At Fig. 4, we have shown the same starting apparatus illustrated at Fig. 4 applied to a Y-connected three-phase squirrel-cage inductor motor, having motor terminals 1, 2 and 3. The capacitor starting apparatus of Fig. 4 corresponds in all respects to the starting apparatus of Fig. 1 and like parts have been assigned the same reference numerals, so that no further description of the apparatus shown at Fig. 4 is deemed necessary.

It will be evident to those skilled in the art that the same vectorial analysis set forth above applies to the voltages between the motor terminals 1, 2 and 3 at Fig. 4. These delta voltage vectors may be converted in a well understood manner to equivalent wye relationships, and it will then appear that the motor winding currents in the circuit of Fig. 4 are in relatively displaced phase relation so long as the capacitors 5 and 6 are unequal.

It will be further understood that the capacitors 8 and 9 bear to each other the same relationship as the capacitors 5 and 6, the large and small capacitors 8 and 9 respectively being merely shunted across the large and small capacitors 5 and 6 respectively to increase both capacitive impedances under starting conditions. Under running conditions the capacitors 8 and 9, if left across the line as shown, serve to improve the system power factor, since the motor itself is an inductive load.

While we have shown and described a preferred embodiment of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. In an apparatus for starting and running from a single phase source of alternating electric current supply a three phase alternating current motor having three motor terminals, a pair of electric conductors for connecting two of said motor terminals to said single phase supply source, a first pair of capacitors connected in series circuit relation between said conductors and having a first common terminal, means for connecting said first common terminal to said third motor terminal, a second pair of capacitors connected in series circuit relation between said conductors and having a second common terminal, and switching means responsive to current in one of said conductors for connecting said first and second common terminals together.

2. In an apparatus for starting and running from a single phase source of alternating electric current supply a three phase alternating current motor having three motor terminals, a pair of electric conductors for connecting two of said motor terminals to said single phase supply source, a first pair of unequal capacitors connected in series circuit relation between said conductors and having a first common terminal, means for connecting said first common terminal to said third motor terminal, a second pair of unequal capacitors connected in series circuit relation between said conductors and having a second common terminal, and switching means responsive to current in one of said conductors for connecting said first and second common terminals together under motor starting and overload conditions.

3. In an apparatus for starting and running from a single phase source of alternating electric current supply a three phase alternating current motor having three motor terminals, a pair of electric conductors for connecting two of said motor terminals to said single phase supply source, a first pair of unequal capacitors connected in series circuit relation between said conductors and having a first common terminal, means for connecting said first common terminal to said third motor terminal, a second pair of unequal capacitors connected in series circuit relation between said conductors and having a second common terminal, the larger capacitor of each of said series connected pairs of capacitors being connected to the same one of said conductors, and switching means responsive to the current in said one conductor for connecting said first and second common terminals together under motor starting and overload conditions.

4. In an apparatus for starting and running from a single phase source of alternating electric current supply a three phase alternating current motor having three motor terminals, a pair of electric conductors for connecting two of said motor terminals to said single phase supply source, a first pair of unequal capacitors connected in series circuit relation between said conductors and having a first common terminal, means for connecting said first common terminal to said third motor terminal, a second pair of unequal capacitors connected in series circuit relation between said conductors and having a second common terminal, the larger capacitor of each said pairs of capacitors having a line terminal connected to the same one of said conductors, normally open switching means for connecting said first and second common terminals together, and means responsive to the current in said conductor at a point between said capacitor line terminals for closing said switching means under motor starting and overload conditions.

FREDERICK M. COURTNEY.
HAROLD H. P. LEMMERMAN.

REFERENCES CITED

The following references are of record in the file of this patent:

UNITED STATES PATENTS

| Number | Name | Date |
| --- | --- | --- |
| 1,708,334 | Spencer | Apr. 9, 1929 |